(12) United States Patent
Corkum et al.

(10) Patent No.: US 6,829,247 B1
(45) Date of Patent: Dec. 7, 2004

(54) METHOD AND APPARATUS FOR ESTABLISHING DEDICATED LOCAL AREA NETWORK N) CONNECTIONS IN AN OPTICAL TRANSMISSION NETWORK

(75) Inventors: Trevor D. Corkum, Mahone Bay (CA); Bernard Lemieux, Hull (CA); Mark S. Wight, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/471,093

(22) Filed: Dec. 23, 1999

(51) Int. Cl.$^7$ .................. H04J 3/02; H04J 3/16
(52) U.S. Cl. ..................... 370/465; 370/539
(58) Field of Search .................. 370/907, 404, 370/522, 523, 528, 529, 537, 538, 465, 470, 473, 474, 527

(56) References Cited

U.S. PATENT DOCUMENTS 5,828,670 A * 10/1998 Narasimha et al. ......... 370/516
5,915,054 A * 6/1999 Ota ........................... 385/46
6,195,346 B1 * 2/2001 Pierson, Jr. .................. 370/352
6,222,848 B1 * 4/2001 Hayward et al. ............ 370/412

* cited by examiner

*Primary Examiner*—Chau Nguyen
*Assistant Examiner*—Soon-Dong Hyun

(57) ABSTRACT

The present invention provides a method and apparatus for establishing dedicated local area network (LAN) connectivity between network elements (NEs) in an optical transmission network without using any of the payload transport capacity available. In order to provision dedicated LAN connections between NEs, the invention reallocates existing overhead functionality to provide dedicated bandwidth for LAN communications between NEs. At each NE, a respective LAN interface unit provides access to this dedicated bandwidth and allows LAN devices such as personal computers (PCs), servers and monitoring equipment to communicate across NEs of an optical transmission network without consuming any payload transport capacity available therein.

47 Claims, 5 Drawing Sheets

METHOD AND APPARATUS FOR ESTABLISHING DEDICATED LOCAL AREA NETWORK N) CONNECTIONS IN AN OPTICAL TRANSMISSION NETWORK

FIELD OF THE INVENTION

The present invention generally relates to optical transmission networks and more particularly to the establishment of dedicated LAN connections in optical transmission networks.

BACKGROUND OF THE INVENTION

In optical transmission networks, information is transmitted between network elements (NEs) via optical fibers. As is well known, the majority of the transmission capacity available in each fiber is typically used for transporting client information (hereinafter referred to as payload) while some capacity (hereinafter referred to as overhead) is set aside for transmission management and control.

In the majority of optical transmission networks, it is common to provision dedicated connections between NEs which do not use any of the optical fiber capacity used for payload transmissions. These connections are highly desirable because they can provide some additional and separate connectivity between NEs without using any transport capacity which could otherwise serve for transmitting payload information and generate revenues.

Dedicated connections are often provisioned in optical transmission networks to provide remote access to or interconnect local area networks (LANs). For example, dedicated connections will be established between NEs of an optical transmission network where different NEs are located in close proximity of separate LANs or where a user connected to one NE wishes to access a LAN located in proximity of another NE. By using dedicated connections, LANs can be interconnected or remotely accessed through an optical transmission network without using any of the payload capacity available therein.

Dedicated connections in an optical transmission network can also be used to monitor equipment for maintenance, administration, provisioning or simply to monitor data transmissions. Typically, the monitoring is performed remotely from a central monitoring unit installed in proximity to a particular NE, and connected to other NEs in the network via dedicated monitoring connections.

Presently, various methods are used to provide dedicated connectivity between NEs of an optical transmission network. However, these methods all present a number of disadvantages.

Considering in particular the equipment monitoring usage, one traditional approach is to use a standard telephone connection between the monitoring unit and each NE in the network where equipment is to be monitored. In this approach, each telephone connection is terminated at its ends with a respective modem. At each NE, the modem terminating the telephone connection is connected directly to the monitored equipment by way of a serial connection such as, for example, RS-232. For NEs with multiple pieces of equipment to monitor, a pool of modems connected in parallel must be used where each modem provides a connection between the monitoring unit and a particular device or element to monitor in a one to one (1:1) arrangement.

Apart from the inherent bandwidth restrictions of conventional telephone lines, this approach has a number of drawbacks. First, telephone network connectivity is required at both the monitoring site and each of the NEs where equipment is to be monitored. For NEs with many devices or elements to monitor where, as noted above, a large number of modems is required, this approach could be quite prohibitive, particularly for NEs in remote areas.

In addition to being prohibitive, this method increases the complexity of the monitoring equipment. More specifically, with the need to establish at least one telephone connection and use at least one modem at each NE where equipment is to be monitored, data collection cannot be easily automated unless a sophisticated-monitoring unit is used. Further, because the modems and telephone connections used at each NE are external to the optical transmission network, they must be managed separately. Apart from the obvious resulting high cost, maintaining a separate network of telephone connections and modems would also have a considerable impact on the overall complexity of the monitoring equipment.

Another conventional method used to provide dedicated connectivity for remotely monitoring equipment at NEs without using the available network capacity consists of deploying a dedicated network of data connections linking the monitoring unit with each monitored NE site. According to this method, each data network connection is terminated at its ends with a respective bridge. At each NE, the bridge terminating the network connection is connected directly to the monitored equipment by way of a multi-access link such as Ethernet. Similarly to the telephone method described above where at each NE, modems must be connected to the monitored equipment in a 1:1 configuration, a bridge can also be connected in a 1:1 arrangement. In contrast however, bridges can also be connected in a 1:N arrangement if a large number of devices must be monitored.

An obvious advantage of dedicated data network connections over telephone lines is that the capacity provided by data network connections is considerably higher and with possible 1:1 or 1:N connection arrangements, the connectivity provided at each NE is more flexible. However, despite offering a higher transmission capacity and a more flexible connectivity at each NE, this approach requires that a separate data network be deployed and maintained separately from the optical transmission network. Similarly to the telephone line approach described above, the provisioning and maintenance of a separate data network substantially increases the overall cost and complexity of the optical transmission network.

In synchronous optical networks (SONET), another conventional method for remotely monitoring equipment without using any of the available payload transport capacity consists of using an audio channel in the SONET overhead. This channel typically referred to as the orderwire (OW) channel is normally provisioned for voice communications in the network. According to this method however, the OW channel is provisioned instead to establish a monitoring connection between NEs and a monitoring unit.

According to this method, the monitoring unit is connected to a nearby NE with a modem and a telephone line to access to OW channel. At NEs with equipment to monitor, a telephone line terminated with a modem is also used to connect to the OW channel. For NEs with multiple pieces of equipment to monitor, a pool of modems connected in parallel must also be used where each modem provides a connection between the monitoring unit and a particular device or element to monitor.

The main benefit of this approach is that it does not require a separate telephone network. However, because modems and telephones lines are still necessary, the disadvantages associated with their use also apply to this method. This includes low capacity, limited connection flexibility at the NEs (limited to 1:1 configurations and not 1:N configurations), complex data collection at the monitoring unit and the need to manage a network of modems separately from the optical transmission network.

Therefore, in view of the shortcomings of conventional dedicated connection schemes, it would be desirable to provide optical transmission networks with dedicated connections between NEs which are cost-effective, simple and can offer increased capacity, flexible connectivity without the need for managing or maintaining external network components.

SUMMARY OF THE INVENTION

The present invention provides a method and apparatus for establishing dedicated local area network (LAN) connectivity between network elements (NEs) in an optical transmission network without using any of the payload transport capacity available.

In order to provision dedicated LAN connections in an optical transmission network without using the available payload transport capacity, the invention reallocates overhead functionality to provide dedicated bandwidth between NEs. At each NE, a respective LAN interface unit provides access to this dedicated bandwidth and allows the NEs or LAN networks or devices connected thereto such as personal computers (PCs), servers and monitoring equipment to communicate without consuming any payload transport capacity available in the network.

According to a broad aspect, the invention provides a method of transmitting LAN data in an optical transmission network wherein information is transmitting frames, each frame containing a first plurality of bytes for transmitting payload data and a second plurality of bytes for transmitting overhead data, the method comprising allocating in each frame one or more bytes of the second plurality of bytes for LAN data transmissions, for each LAN data transmission, transmitting frames with LAN data in the one or more allocated bytes until the LAN data transmission is complete.

According to another broad aspect, the invention provides an optical transmission network formed of multiple NEs interconnected with optical links where each link has a defined payload transmission capacity allocated for payload data transmissions and a defined overhead transmission capacity allocated for overhead data transmissions of which a portion is reallocated for LAN data transmissions, the optical transmission network comprising at each NE a LAN interface connected to receive LAN data from one or more LAN devices for transmission in the reallocated portion of the overhead transmission capacity and an optical transmitter connected to the LAN interface and operable to transmit the received LAN data using the reallocated portion of the overhead transmission capacity.

According to yet another broad aspect, the invention provides an apparatus for a first NE in an optical transmission network for transmitting LAN data to a second NE via an optical link interconnecting the first and second NE wherein the optical link has a defined payload transmission capacity allocated for payload data transmissions and a defined overhead transmission capacity allocated for overhead data transmissions of which a portion is reallocated for LAN data transmissions, the apparatus including a LAN interface connected to receive LAN data for transmission with the reallocated portion of the overhead transmission capacity and an optical transmitter connected to the LAN interface and operable to transmit the received LAN data using the reallocated portion of the overhead transmission capacity.

According to yet another broad aspect, the invention provides a LAN interface connecting a LAN device to a NE in an optical transmission network of a defined payload transmission capacity allocated for payload data transmissions and a defined overhead transmission capacity allocated for overhead data transmissions of which a portion is reallocated for LAN data transmissions, the LAN interface being operable to receive LAN data from the LAN device and process the LAN data received for transmission using the reallocated portion of the overhead transmission capacity. Preferably, the reallocated portion can either be an optical channel such as the optical service channel (OSC) or overhead bytes in an optical channel. In the latter case, the overhead bytes could be one or more overhead bytes.

The invention can be incorporated in any optical transmission network topology or configuration such as for example, synchronous optical networks (SONET) or optical transport networks (OTN) where it is desirable to establish dedicated connections between NEs without using any of the payload transport capacity available.

In a preferred embodiment, the invention is used to provide dedicated layer 2 Ethernet connectivity between NEs in a SONET network. In order to provide this Ethernet connectivity, the invention uses F1 bytes in the SONET overhead to establish dedicated bandwidth for Ethernet communications between NEs. When the SONET overhead is not visible, it is possible to use other overhead functionality to establish dedicated bandwidth. In another preferred embodiment, an optical service channel is used to provide this dedicated bandwidth. In both embodiments, an Ethernet wayside (EW) unit is used at each NE to provide access to this dedicated bandwidth. The EW unit can be used to attach multiple Ethernet devices or networks.

By using overhead bytes (e.g. F1 bytes) or optical channels which are conventionally allocated for overhead, the invention can be used to support various LAN communications across the NEs without using any of the payload bandwidth available. For example, the dedicated bandwidth could be used for software download of loads to each NE. Alternatively, a network administrator at a monitoring unit could remotely monitor equipment at or in proximity of the NEs in the network without consuming any of the payload transmission capacity available and adversely affect transport revenues.

Another advantage of the invention is that the dedicated LAN connections provided by the present invention can provide in excess of 10 megabits per second of transport capacity. In addition, the dedicated LAN connections are provisioned internally to the optical transmission network therefore eliminating the need for deploying and maintaining any additional telephone or data network external to the optical transmission network. Therefore, the overall cost of providing dedicated connections in an optical transmission network is considerably reduced.

Yet another advantage of the present invention is that multiple LAN devices can be connected at each NE via a single LAN interface unit (e.g. a EW unit). With this ability, the invention can advantageously be used to establish point-to-point or point-to-multipoint LAN connections between NEs of an optical transmission network. In addition to equipment monitoring, these point-to-point or point-to-multipoint LAN connections can also be used for LAN applications such as for example, connectivity between LANs or as a further example, remote access by one or more users to a LAN.

DETAILED DESCRIPTION OF THE PREFERRED EMBODIMENTS

The present invention provides a method and apparatus for establishing dedicated local area network (LAN) connectivity between network elements (NEs) in an optical transmission network. The invention uses overhead functionality to provide dedicated bandwidth for LAN communications without using any of the payload transport capacity available. At each NE, a respective LAN interface unit provides access to this dedicated bandwidth and allows LAN devices such as personal computers (PCs), servers and monitoring equipment to communicate across NEs of an optical transmission network without consuming any of the available payload transport capacity.

The invention can be incorporated in any optical transmission network topology or configuration such as for example, synchronous optical networks (SONET) or optical transport networks (OTN) where it is desirable to establish dedicated connections between NEs without using any of the payload transport capacity available. In a preferred embodiment, the invention is incorporated in a SONET network to provide layer 2 Ethernet connectivity between NEs without using any payload bandwidth.

There are presently various SONET network architectures in which the invention can be used including for example, point-to-point (linear), point-to-multipoint, hub or ring configurations. For clarity however, the invention is described below only in relation to point-to-point or linear SONET network configurations.

Figure 1:
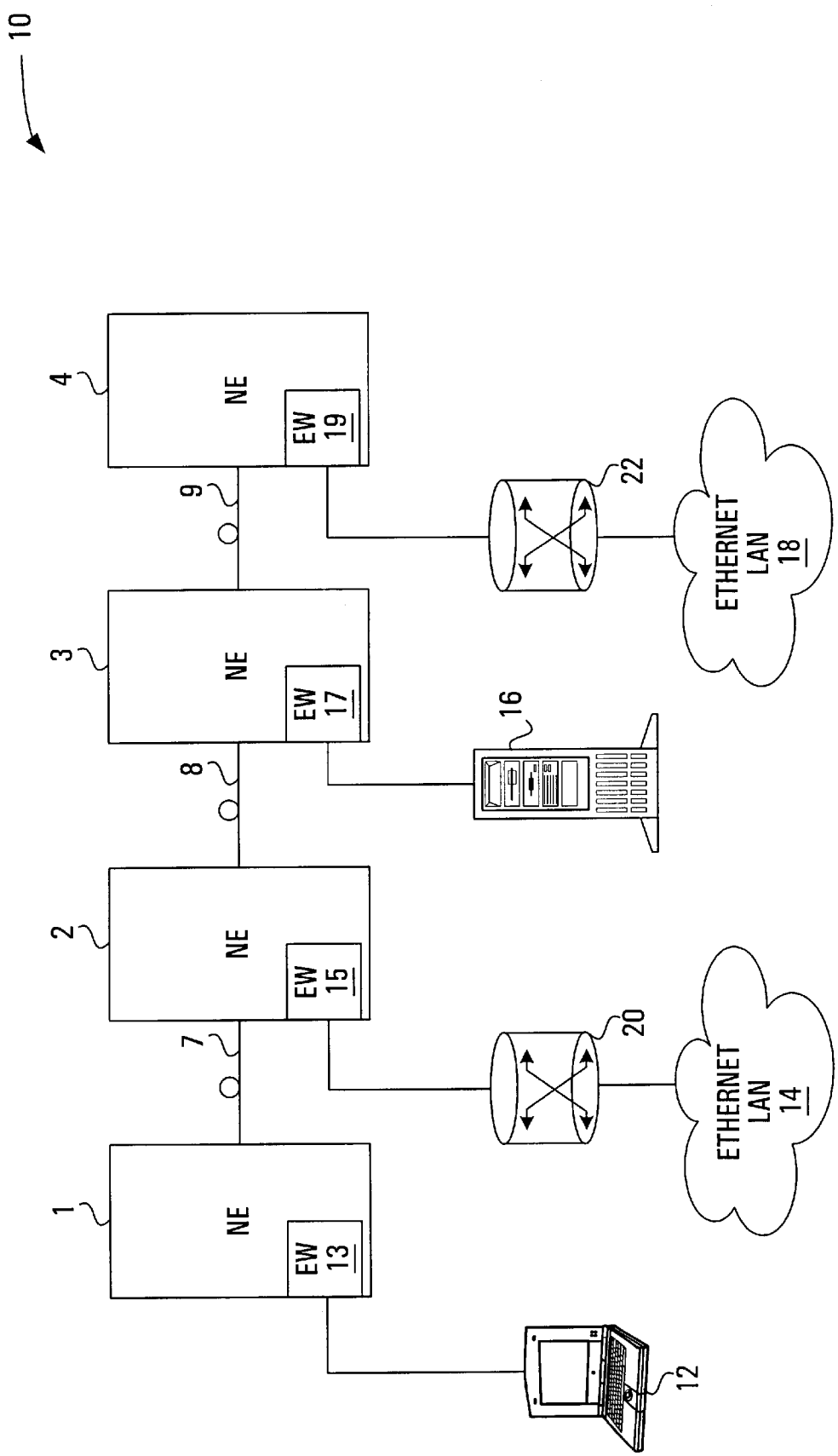
FIG. 1 is a diagram of a synchronous optical network (SONET) which provides Ethernet connectivity between network elements (NEs) according to a preferred embodiment of the invention.

An example of a linear SONET network is shown in FIG. 1 as generally indicated by 10. The SONET network 10 illustrated therein is composed of a plurality of NEs 1, 2, 3, 4 (only four shown). According to the invention, the NEs 1, 2, 3, 4 can be any section, line or path terminating equipment such as, for example, add-drop multiplexers, regenerators or digital cross-connects. The NEs 1, 2, 3, 4 are interconnected in series by a plurality of optical carrier (OC) links 7, 8 and 9 via which the NEs 1, 2, 3, 4 are designed to transmit and receive data optically. As in any other SONET infrastructure, the majority of the transmission capacity available on each OC link 7, 8, 9 of the SONET network 10 is used to transport revenue-producing traffic (payload) while some capacity (overhead) is set aside for managing and controlling payload transmissions.

In addition to this standard SONET infrastructure, each NE 1, 2, 3, 4 is designed with a respective Ethernet wayside (EW) unit 13, 15, 17, 19 to attach various Ethernet devices or Ethernet LANs. According to the preferred embodiment of the invention, the EW units 13, 15, 17, 19 can each connect up to four different Ethernet devices or networks. For the purpose of example, the NEs 1 and 3 are respectively connected to a laptop PC 12 and a network monitoring unit 16 while the NEs 2 and 4 are each connected to a respective Ethernet LAN 14, 18 through a corresponding network router 20, 22. The routers 20, 22 operate to limit LAN traffic reaching the NEs 1, 3 to only that traffic which requires to traverse the SONET network 10.

If necessary, more EW units can be used at each NE 1, 2, 3, 4 if to connect additional Ethernet devices or networks. For clarity however, it is assumed that only one EW unit 13, 15, 17, 19 is used at each NE 1, 2, 3, 4 to connect the PC 12, the Ethernet LAN 14, the monitoring unit 16 and the Ethernet LAN 18 respectively.

According to the invention, the SONET network 10 can support Ethernet communications between the PC 12, the monitoring unit 16 and the Ethernet LANs 14, 18 without using any payload transport capacity on the OC links 7, 8, 9 which could otherwise be sold or leased to network clients.

The manner in which this Ethernet connectivity is provided will now be described below in further detail. To begin however, a description of conventional SONET operations on the OC links 7, 8, 9 is given as this is required for an understanding of the Ethernet connectivity provided across the OC links 7, 8, 9.

According to the SONET standard, each OC link 7, 8, 9 in the SONET network 10 can be designed to carry one or more SONET base signals. In SONET, a SONET base signal is referred to as synchronous transport signal level 1 or STS-1 and is defined to operate at 51.84 megabits per seconds (Mbps). In conventional SONET systems, it is common to design OC links which can carry multiple STS-1 signals. Typically, the STS-1 signals are multiplexed together and form higher level signals which operate at integer multiples of the basic STS-1 rate.

For example, three multiplexed STS-1 signals can be multiplexed to form an STS-3 signal that operates at three times the base rate of 51.84 Mbps or at 155.520 Mbps. Similarly, 48 multiplexed STS-1 signals can form an STS 48 signal which operates at 48 times the base rate of 51.84 Mbps or at 2.488 gigabits per second (Gbps). In more sophisticated configurations, OC links are designed to carry up to 192 multiplexed STS-1 signals and provide close to 10 Gbps of transport capacity. OC links which can carry 192 multiplexed STS-1 signals are typically referred to as OC-192 links.

In the SONET network 10 of FIG. 1, the OC links 7, 8, 9 of the SONET network 10 can be designed to meet different capacity demands. For the purpose of example, the OC links 7, 8, 9 are hereinafter assumed to be OC-192 links which carry STS-192 signals. However, it is understood that the links 7, 8, 9 can also be designed with lower transport capacities and carry lower rate STS signals if desired. Alternatively, the links 7, 8, 9 may also be designed with higher capacities should future transmission technologies allow.

Figure 2:
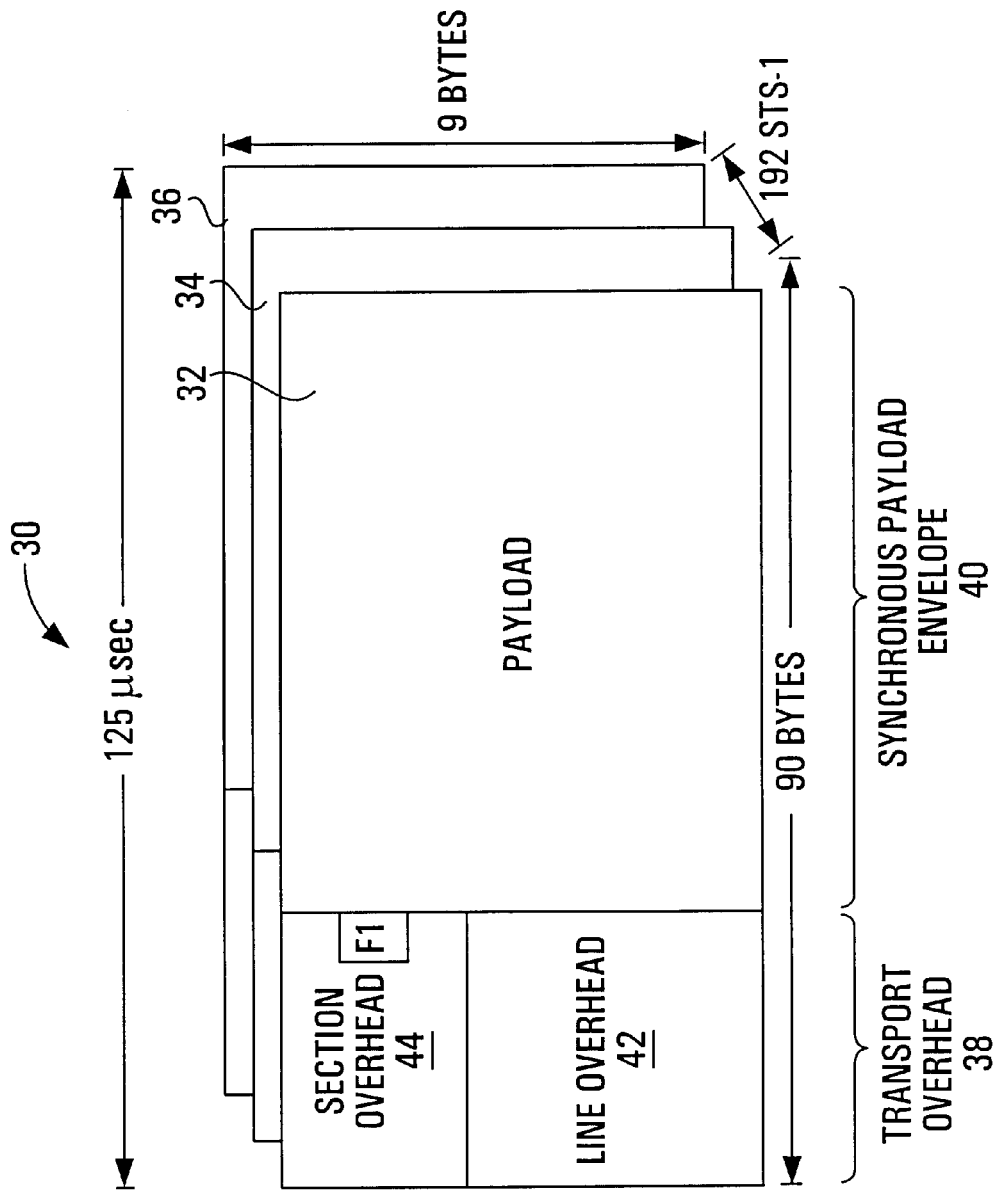
FIG. 2 is a standard synchronous transport signal level N (STS-N) frame used in the SONET network of FIG. 1.

For the transmission of STS-N signals such as for example STS-192 signals (N=192), SONET defines a standard STS-N frame structure which contains an envelope capacity for transporting payload data and various fields for overhead information. FIG. 2 shows an example of a standard STS-N frame as defined in SONET.

The STS-N frame 30 shown in FIG. 2 is generally denoted by 30 and consists of N STS-1 frames 32, 34, 36 (only three shown) which, in SONET, are respectively numbered 1 to N. The number (N) of STS-1 frames 32, 34, 36 contained in the STS-N frame 30 normally corresponds to the number of STS-1 signals carried in the STS-N signal. As an example, for OC-192 links such as the OC links 7, 8, 9 carrying an STS-192 signal which is formed of 192 multiplexed STS-1 signals, the STS-N frame 30 would consists of 192 STS-1 frames with each frame corresponding to one of the 192 STS-1 signals multiplexed. The STS-1 frames 32, 34, 36 can thus be said multiplexed to form the STS-N frame 30.

In the STS-N frame 30, the STS-1 frames 32, 34, 36 are all identically structured in accordance with a standard frame format defined in SONET. Considering in particular the STS-1 frame 32, the STS-1 frame format defined in SONET is a specific sequence of 810 bytes or 6480 bits arranged in a 90-column by 9-row structure where each column contains 9 bytes and each row contains 90 bytes. According to SONET, the STS-1 frame 32 has a frame length of 125 μsec. With a 125 μsec frame length, 8000 STS-1 frames such as the STS-1 frame 32 can be transmitted each second. Considering that each STS-1 frame contains 6480 bits, the rate at which an STS-1 signal can be transmitted is given by:

STS-1 rate=6480 bits/frame*8000 frames/second;

=51,84 Mbps which, as noted above, is the base rate in SONET.

Considering the STS-1 frame 32 in more detail, the first three columns (columns 1 through 3) of the frame 32 are used for transport overhead 38 while the remaining columns (columns 4 through 90) define a synchronous payload envelope (SPE) 40. The SPE 40 consists of 783 bytes and can be depicted as an 87-column by 9-column structure. With the exception of some overhead bytes such as the STS path overhead bytes (not shown), the SPE 40 is mainly used to carry payload data.

Considering now the transport overhead 38 located in the first three columns of the STS-1 frame 32, the transport overhead 38 contains 27 bytes. Of these, 18 bytes are allocated for line layer overhead 44 (hereinafter the "line overhead") and 9 bytes are provisioned for section layer overhead 42 (hereinafter the "section overhead"). The line overhead 44 is located in rows 4 to 9 of the transport overhead 38 and is typically used to support line control functions such as signal multiplexing, protection switching and maintenance between line-terminating equipment.

The section overhead 42 is located in rows 1 to 3 of the transport overhead 38. The overhead bytes contained in the section overhead 42 are respectively labelled A1, A2, J0/Z0, B1, E1, F1, D1, D2 and D3. With the exception of the F1 byte, the section overhead bytes are used for a variety of section control functions including signal performance monitoring, administration, maintenance and provisioning between section-terminating equipment. The F1 byte does not have any specific control function assigned and is usually set aside for user purposes. This is also true of every other F1 byte present in each STS-1 frame 32, 34, 36 of the STS-N frame 30.

According to the preferred embodiment, these F1 bytes can be used to provide dedicated bandwidth across the OC links 7, 8, 9. This dedicated bandwidth is highly desirable in optical transmission networks such as the SONET network 10 because it can be used to interconnect various Ethernet devices or networks across the OC links 7, 8, 9 without using any transport capacity therein which could otherwise serve for transmitting payload information.

According to the invention, it is possible to use other overhead bytes in the SONET overhead to provide dedicated bandwidth across the OC links 7, 8, 9. In this case however, the SONET usage defined for the bytes used would have to be disabled. This may be possible in some systems where depending on the particular transmission functionality required, the SONET usage of some overhead bytes may not be required. According to the invention, these bytes can be re-provisioned to provide dedicated bandwidth. More generally, any overhead bytes with a defined usage which is not essential can be allocated instead to provide dedicated bandwidth.

In the preferred embodiment of the invention, F1 bytes are used to provide dedicated bandwidth across the OC links 7, 8 and 9. According to the preferred embodiment, the number of F1 bytes allocated for this dedicated bandwidth can be selected to meet different needs. For example, with one F1 byte (which contains 8 bits), the following dedicated bandwidth BW(1) would be obtained:

BW(1)=1 byte/STS-1 frame*8 bits/byte*8000 STS-1 frames/s;

=64 Kbps

By using more F1 bytes, this bandwidth can be increased. It will be recalled that the OC links 7, 8, 9 are OC-192 links which can each support 192 STS-1 signals. Because each STS-1 signal is provisioned with one F1 byte per frame, up to 192 F1 bytes could be used. In other words, 192 F1 bytes are available per STS-N frame. According to SONET, the STS-N frame also has a length of 125 μsec and with a 125 μsec frame length, 8000 STS-N frames 30 can be transmitted each second. 192 F1 bytes would provide a dedicated bandwidth BW(192) of:

BW(192)=192 bytes/STS-N frame*8 bits/byte*8000 STS-N frames/s;

=12.288 Mbps

With a dedicated bandwidth in excess of 10 Mbps, native 10 baseT Ethernet connectivity can be provided throughout the SONET network 10, if necessary. The bandwidth can also be used for lower capacity requirements. For example, 33 F1 bytes would suffice to support E1 or DS-1 signals. In the preferred embodiment, to support these signals, only the F1 bytes of STS-1 frames 2–12, 14–24 and 26–36 are used. These 33 F1 bytes provide the following dedicated bandwidth BW(33):

BW(33)=33 bytes/STS-N frame*8 bits/byte*8000 STS-N frames/s;

=2.11 Mbps

This dedicated bandwidth of 2.11 Mbps across the OC links 7, 8, 9 can be used for various Ethernet purposes. For example, the dedicated bandwidth could be used for software download of loads to the each NE 1, 2, 3, 4. Alternatively, a network administrator at the monitoring unit 16 could remotely monitor equipment at or in proximity of the NEs 1, 2 and 4 without consuming any of the payload transmission capacity available. The 2.11 Mbps bandwidth could also be used for Ethernet LAN applications such as, for example, connectivity between the Ethernet LANs 14, 18 or remote access to one of the LANs 14, 18. In the latter case, a user at the PC 12 may connect to the Ethernet LAN 14 for down loading a file or simply establish a connection with another user within the network 14.

According to the invention, by provisioning an appropriate number of F1 bytes as dedicated bandwidth on the OC links 7, 8, 9, various Ethernet communications can be supported on the OC links 7, 8, 9 without using any of the payload transmission capacity available therein. Generally, the F1 bytes can be dedicated for any Ethernet application where it is desirable to transmit information on the OC links 7, 8, 9 without using any transmission bandwidth available therein that could otherwise be used to transport payload traffic and generate revenues.

According to the preferred embodiment, in order to support Ethernet communications across the OC links 7, 8, 9, each NE 1, 2, 3, 4 is designed with the ability to direct Ethernet traffic between an attached Ethernet device or network and adjacent OC links 7, 8, 9. More specifically, the NE 1, 2, 3, 4 are each designed with the ability to receive Ethernet frames from an attached Ethernet device or network and direct these frames to adjacent OC links 7, 8, 9 for transmission to another NE 1, 2, 3, 4. Similarly, the NEs 1, 2, 3, 4 are also designed with the ability to receive Ethernet frames which have been transmitted on an adjacent OC link 7, 8, 9 and forward these frames to an attached Ethernet device or network.

It is understood that in addition to this, the NEs 1, 2, 3, 4 are also designed with conventional elements to perform standard SONET operations. However, except where otherwise provided, these elements are well known in the art and are not described here in any detail. For clarity, only the elements involved in directing Ethernet frames at each NE 1, 2, 3, 4 between an attached Ethernet device or network and adjacent OC links 7, 8, 9 are described.

According to the preferred embodiment, the elements involved at each NE 1, 2, 3, 4 in the handling of Ethernet frames between an attached Ethernet device or network and adjacent OC links 7, 8, 9 are identical and will now be described only in relation to the NE 2. In the NE 2, the Ethernet traffic directed to and from the attached Ethernet LAN 14 is handled by the resident EW unit 15 while the traffic to and from the adjacent OC links 7 and 8 is handled by a respective OC-192 transceiver (T/R).

Figure 3:
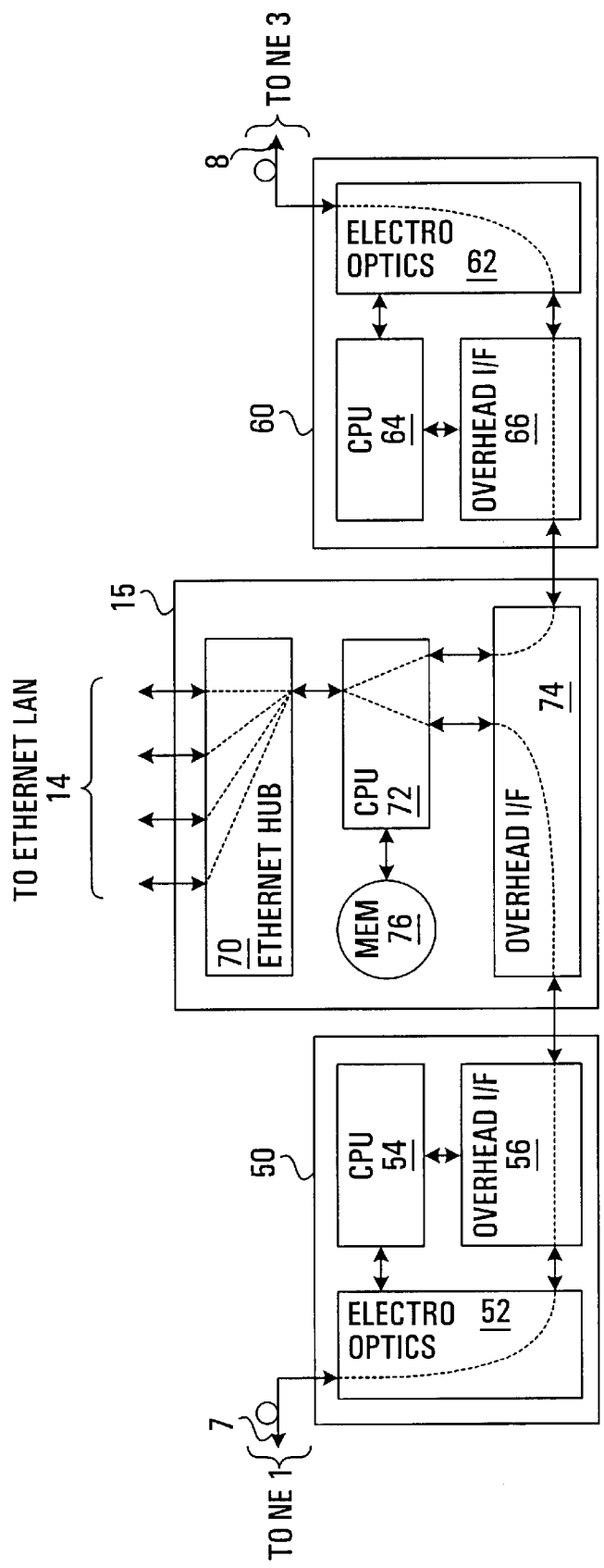
FIG. 3 is a block diagram of two optical carrier (OC)-192 transceivers (T/Rs) and an Ethernet wayside (EW) unit used in one NE of FIG. 1.

Referring to FIG. 3 where these elements are illustrated in detail, a conventional OC-192 T/R 50, 60 is coupled to each OC link 7 and 8. As part of their conventional transmitting and receiving functions, the OC-192 T/Rs 50, 60 are responsible to transmit and receive Ethernet frames on the OC links 7, 8. Between the OC-192 T/Rs 50, 60 and coupled thereto, the EW unit 15 provides the necessary Ethernet connectivity in the NE 2 to direct Ethernet frames to and from the Ethernet LAN 14.

More specifically, the EW unit 15 has an Ethernet hub 70 with four Ethernet ports coupled to the Ethernet LAN 14. The Ethernet hub 70 is connected internally to a central processing unit (CPU) 72 which itself is connected to both a memory unit 76 and an overhead interface 74. The overhead interface 74 hereinafter referred to the EW overhead interface 74 is externally connected to each OC-192 T/R 50, 60.

In the OC-192 TR 50, an overhead interface 56 hereinafter referred to as the T/R overhead interface 56 is externally coupled to EW overhead interface 74. Internally, the T/R overhead interface 56 is connected to a CPU 54 and an electro-optics unit 52. The electro-optics unit 52 is in turn connected to the CPU 54 and coupled externally to the OC link 7.

Similarly to the OC-192 T/R 50, the OC-192 T/R 60 also has a T/R overhead interface 66, a CPU 64 and an electro-optics unit 62. With the exception that the electro-optics unit 62 is coupled to the OC link 8 instead of the OC link 7, these devices are all interconnected identically to the T/R overhead interface 56, the CPU 54 and the electro-optics unit 52 of the OC-192 T/R 50.

When an Ethernet frame arrives at the EW unit 15 to be transmitted to an adjacent NE 1, 3, the frame is received in the Ethernet hub 70 which forwards the frame to the CPU 72 for processing. At the CPU 72, the frame is examined to determine its destination and encapsulated into a wide area network (WAN) frame format so that the Ethernet data can be transmitted in the SONET network 10. From the CPU 72, the WAN frame is then forwarded to the EW overhead interface 74 where it is encapsulated into an overhead (OH) frame. Depending on its destination, the EW interface 74 can forward the OH frame either to the OC-192 T/R 50 for transmission on the OC link 7 or the OC-192 T/R 60 for transmission on the OC link 8.

If the OH frame is forwarded to the OC-192 T/R 50, the OH frame is received in the T/R overhead interface 56. With appropriate control from the CPU 54, the T/R overhead interface 56 extracts the WAN frame from the OH frame received. As part of assembling each STS-N frame, the T/R overhead interface 56 places the extracted WAN frame into the F1 bytes of the STS-1 frames 2–12, 14–24 and 26–36. The T/R overhead interface 56 then forwards each STS-N frame assembled to the electro-optics unit 52 for transmission on the OC link 7.

If instead the OH frame is forwarded to the OC-192 T/R 60, the OH frame would be processed in the T/R overhead interface 66 in the same manner it would be processed in the T/R overhead interface 56. As such, the OH byte would also be processed to extract the WAN frame contained therein and place the WAN frame extracted into the F1 bytes of the STS-1 frames 2–12, 14–24 and 26–36 of each STS-N frame assembled. Similarly to the T/R overhead interface 56, the T/R overhead interface 66 also forwards each STS-N frame assembled to the electro-optics unit 52 for transmission on the OC link 8.

Figure 4:
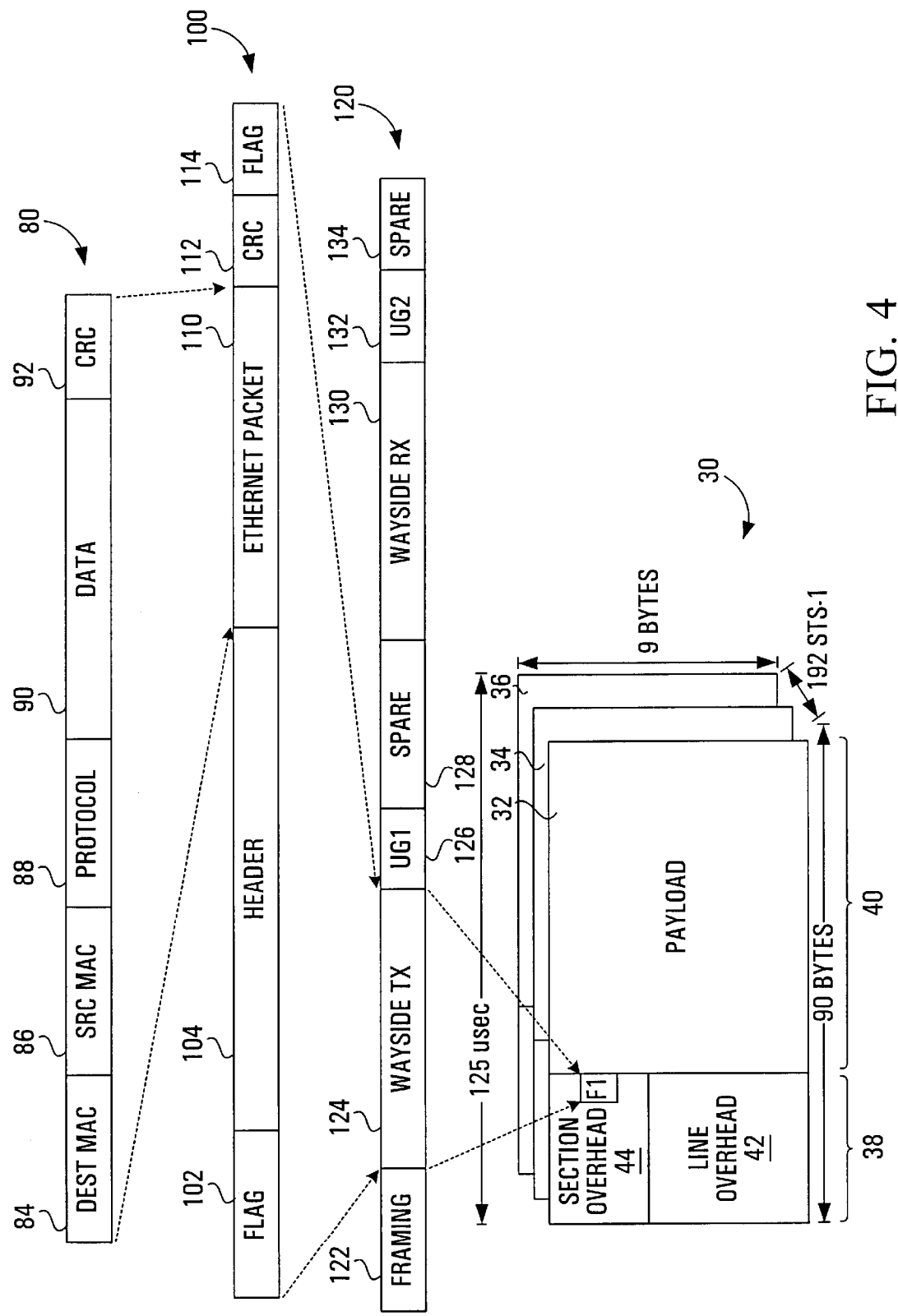
FIG. 4 is a block diagram of three frame formats used in the NE of FIG. 3.

To further illustrate this, FIG. 4 shows for the purpose of example only an Ethernet frame at different processing stages in the NE 2 prior to its transmission. More specifically, FIG. 4 illustrates an Ethernet frame 80 as it is received from the Ethernet LAN 14, as encapsulated in a WAN frame 100 and as further encapsulated into an OH frame 120. For the purpose of reference, FIG. 4 also shows the SONET STS-N frame 30 of FIG. 2 to further illustrate how the encapsulated Ethernet frame 80 uses F1 bytes in each STS-N frame for transmission on either the OC link 7 or 8.

Considering first the Ethernet frame 80, the Ethernet frame 80 shown has a standard Ethernet header which includes a 6-byte destination medium access control (MAC) address 84, a 6-byte source MAC address 86 and a 2-byte protocol type for proprietary identification. In addition, the Ethernet frame 80 has a data field 90 which can contain from 46 bytes of Ethernet payload data up to 1500 bytes. The Ethernet frame 80 is terminated by a cyclic redundancy code (CRC) 92 which acts as an error detection code to detect the occurrence of transmission errors in the data field 90.

The WAN frame 100 is an example of the type of WAN frames used in the CPU 72 (see the EW unit 15 in FIG. 3) to encapsulate Ethernet frames received from the Ethernet LAN 14 such as for example, the Ethernet frame 80. According to the invention, various WAN frame formats can be used for the WAN frame 100. Preferably and as shown in FIG. 4, the WAN frame 100 is a high-level data link control (HDLC) WAN frame. As such, the WAN frame 100 is formed of a standard HDLC control field 102, an HDLC header 104 which contains various standard HDLC header fields, a payload 110 which can contain one or more Ethernet frames 80, a CRC 112 and another standard HDLC control field 114.

Considering now the OH frame 120, this frame 120 shown as an example only is defined for the transport of WAN frame bytes between the EW overhead interface 74 and the T/R overhead interfaces 56, 66. According to the invention, different OH frame formats can be used for this. In the preferred embodiment, the OH frame 120 contains fields to carry WAN frame bytes in both directions between the EW overhead interface 74 and the T/R overhead interfaces 56, 66. In addition, the OH frame also contains a number of control fields which can be used for proprietary or other purposes as appropriate. In the preferred embodiment, the control fields defined include a framing field 122, two user group (UG) fields 126, 132 and a pair of spare fields 128, 134. It is to be understood however that these particular control fields are merely illustrative of a particular example. Depending on the particular network environment in which the invention is implemented, the OH frame format can be defined with different control fields if necessary.

Considering again the fields defined to carry WAN frame bytes, an EW transmit field 124 is defined to transfer up to 33 bytes of WAN frame data from the EW overhead interface 74 to either the T/R overhead interface 56 or the T/R overhead interface 66. Also defined is an EW receive field 130 which can also carry up to 33 bytes of WAN frame data from either one of the T/R overhead interfaces 56, 66 to the EW overhead interface 74. With the EW transmit field 124 and the EW receive field 130 defined, the OH frame format is such that OH frames 120 can be used to transport WAN frame bytes in both directions between the EW overhead interface 74 and the T/R overhead interfaces 56, 66.

Considering in particular the EW transmit field 124, each WAN frame byte contained in this particular field 124 is placed in a respective F1 byte of one of the STS-1 frame 2–12, 14–24 and 26–36 allocated in each STS-N frame 30 for Ethernet communications. By using 33 F1 bytes in each STS-N frame 30, 33 bytes of the WAN frame 100 (which contains the Ethernet frame 80) can be transmitted every time an STS-N frame 30 is transmitted. Considering that each STS-N frame 30 requires 125 $\mu$sec to transmit, 33 bytes of WAN frame data can be transmitted every 125 $\mu$sec and therefore encapsulated Ethernet frames can be transmitted at a rate of 2.11 Mbps.

Referring back to FIG. 3, in addition to receiving Ethernet frames from the Ethernet LAN 14 and transmitting the Ethernet frames received on the OC links 7, 8 as was described above, the NE 2 can also receive Ethernet frames from the OC links 7, 8 and forward them to the Ethernet LAN 14 through the EW unit 15. The manner in which the NE 2 receives Ethernet frames in the OC-192 T/Rs 50, 60 and forwards them to the Ethernet LAN 14 is identical for both OC-192 T/Rs 50, 60 and will only be described in relation to the OC-192 T/R 50.

As is conventional, the electro-optics unit 52 in the OC-192 T/R 50 is operative to receive STS-N frames transmitted from the OC link 7 and convert each STS-N frame received into an electrical form. The STS-N frames converted are then forwarded to the T/R overhead interface 56. For each STS-N frame, the T/R overhead interface 56 examines the 33 F1 bytes (STS-1 frames 2–12, 14–24 and 26–36) allocated for Ethernet communications to determine whether there is any encapsulated Ethernet data which is intended for the Ethernet LAN 14. If so, the T/R overhead interface 56 extracts the WAN frames containing the Ethernet data and transfers them to the EW overhead unit 74 in OH frames. In the EW overhead interface unit 74, the WAN frames are extracted from the OH frames and forwarded to the CPU 72. The CPU 72 takes the WAN frames and extracts therefrom the Ethernet data frames contained therein which are intended to the Ethernet LAN 14. The Ethernet frames extracted are then forwarded to the Ethernet hub 70 for transmission to the Ethernet LAN 14.

Because only 33 F1 bytes are used for Ethernet connectivity across the OC links 7, 8, 9, the memory unit 76 is designed to provide sufficient buffering to interface the Ethernet LAN 14 with the LAN connections on the OC links 7, 8, 9. Generally, the amount of buffering required in the EW unit 15 will depend on how much bandwidth is dedicated on the OC links 7, 8, 9.

In some situations, the SONET overhead may not always be visible and it may be desirable in these cases to use different overhead functionality to establish Ethernet connectivity. For example, if an OC connection between two NEs of the SONET network 10 passes through multi-wavelength optical repeater (MOR) sites or intermediate line amplifiers (ILAs) or alternatively if any of the NEs 1, 2, 3, 4 are themselves MOR sites or ILS sites, it may not be possible to drop or add Ethernet traffic at those sites because the SONET overhead would not visible.

In these cases, it may be possible according to another preferred embodiment of the invention to use the optical service channel (OSC) instead to add or drop Ethernet traffic. As is well known, the OSC is a reserved wavelength which provides overhead connectivity outside the SONET payload. An advantage of using the OSC channel for Ethernet traffic is that the SONET overhead does not have to be accessed. Instead, the Ethernet traffic can simply be added and dropped in a manner similar to payload traffic circulating in other channels or wavelengths.

Figure 5:
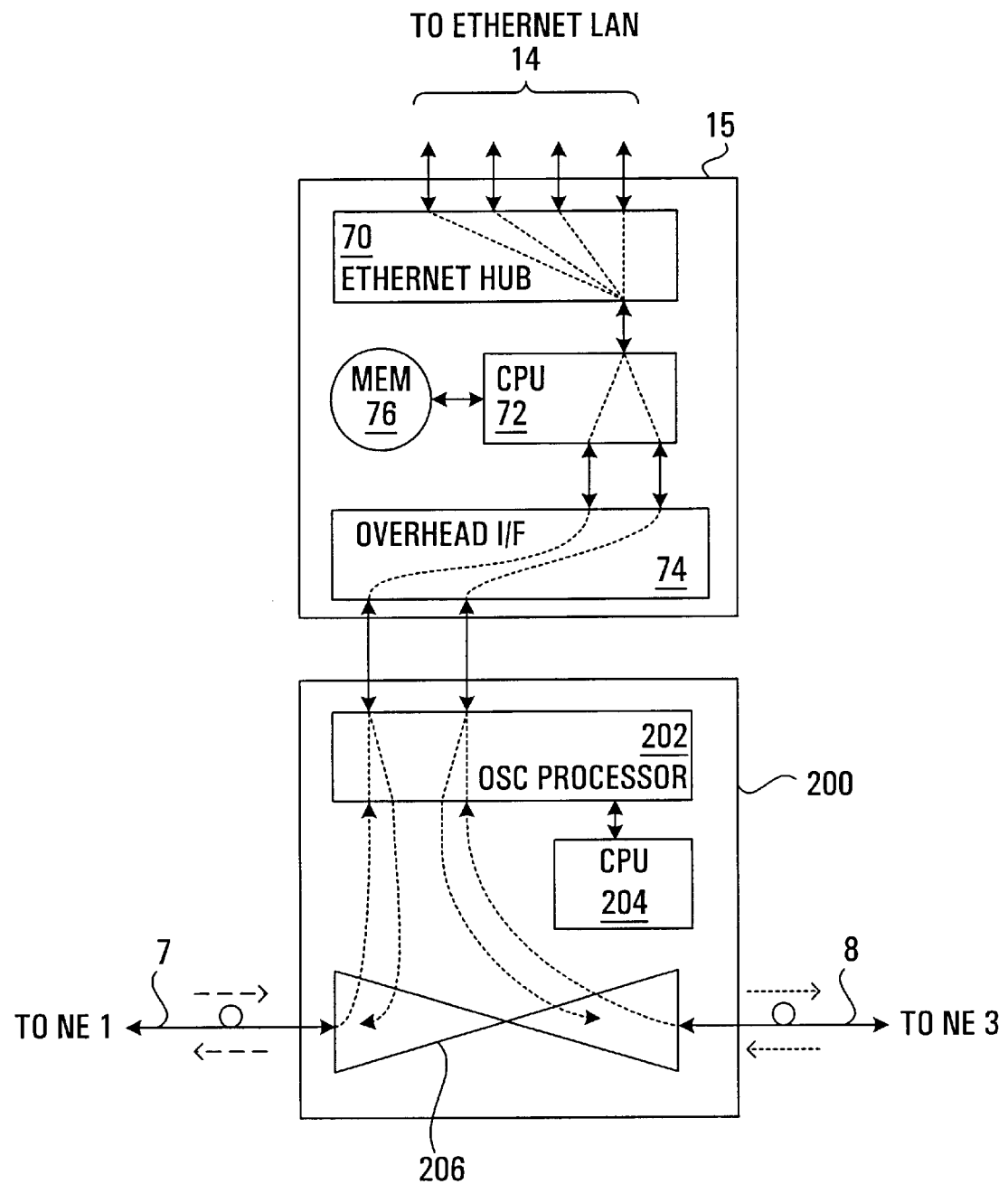
FIG. 5 is a block diagram of a multi-wavelength optical repeater (MOR) and an EW unit which can alternatively be used in the NE of FIG. 3.

To further illustrate this, reference is now made to FIG. 5 where the NE 2 of FIG. 3 is shown therein as a MOR site which regenerates OC-192 signals for continuous transmission between the NEs 1 and 3. Instead of OC-192 T/Rs, the NE 2 is shown in this particular figure with a MOR 200. As is conventional, the MOR 200 has an optical regenerator 206 which can provide access to the OC links 7, 8 by adding or dropping SONET channels or wavelengths including the OSC channel. In order to provide access to the OSC channel, the MOR 200 has an OSC processor 202 connected to the optical regenerator 206 and a CPU 204. According to this embodiment, the OSC processor 202 is externally connected to the EW overhead interface unit 74 of the EW unit.

In this particular embodiment, Ethernet traffic directed to and from the attached Ethernet LAN 14 is handled by the resident EW unit 15 as described above while the traffic to and from the adjacent OC links 7 and 8 is handled by the MOR 200. As part of its conventional regenerating functions, the MOR 200 is responsible to isolate (add/drop) the OSC channel at the NE 2 so that it can be accessed by the Ethernet LAN 14 through the EW unit 15.

When an Ethernet frame arrives at the EW unit 15 to be transmitted to an adjacent NE 1, 3, the frame is received and processed in the EW unit 15 in the same manner described above in relation to FIGS. 3 and 4. More specifically, the Ethernet frame is encapsulated in a WAN frame which itself is encapsulated in an OH frame such as described above so that it can be forwarded to the MOR 200. In the MOR 200, the encapsulated Ethernet frame (as encapsulated in a WAN packet) is extracted from the OH frame and placed in the OSC channel by the OSC processor 202 for transmission to either one of the NEs 1, 3 (or both) through the optical regenerator 206. Because the OSC processor 202 has access to the OSC channel, it can also receive encapsulated Ethernet frames transmitted on the OC links 7, 8 from the NEs 1, 3. Any encapsulated Ethernet frames received would be placed in OH frames and forwarded to the EW unit 15 which would then forward the Ethernet frames received to the Ethernet LAN 14 as described above.

While the invention has been described above with reference to a particular SONET network topology, further modifications and improvements to support other SONET configurations which will occur to those skilled in the art, may be made within the purview of the appended claims, without departing from the scope of the invention in its broader aspect.

More generally, the invention is not restricted to SONET networks and can be incorporated in any optical transmission network topology or configuration such as for example, optical transport networks (OTN) where it is desirable to establish dedicated connections between NEs without using any of the payload transport capacity available.

According to the preferred embodiment described above, the invention provides Ethernet connectivity between NEs. It is to be understood that the invention could also be used to provide other types of layer 2 connectivity including for example DS-1, frame-relay and asynchronous time multiplexing (ATM). However, should the invention be used to provide layer 2 connectivity other than Ethernet, it becomes apparent that there may be elements among those described above which may have to be reconfigured or replaced by components suited for the type of layer 2 connectivity desired.

Further, the 2.11 Mbps of dedicated bandwidth provided by the invention can be increased to meet higher capacity needs. For example, by allocating more bytes in the STS-N transport overhead and/or by using more F1 bytes in the STS-N frame, the 2.11 Mbps could be increased to at least 10 Mbps for native 10 baseT Ethernet connectivity throughout the SONET network.

Also, the invention is also not restricted to the use of F1 bytes in the SONET overhead. According to the invention, it is also possible to use other overhead bytes in the SONET overhead to provide dedicated Ethernet bandwidth. In this case however, the SONET usage defined for the bytes used would have to be disabled. This may be possible in some systems where depending on the particular transmission functionality required, the SONET usage of some overhead bytes may not be required. According to the invention, these bytes can be re-provisioned to provide dedicated bandwidth. More generally, any overhead bytes with a defined usage which is not essential can be allocated instead to provide dedicated bandwidth. Further, as noted above, for situations where the SONET overhead is not visible, it is also possible to use different overhead functionality to establish Ethernet connectivity such as the OSC channel.

The invention has been described above in relation to OC-192 T/Rs implemented as single units. It is to be understood that these transceivers could be implemented differently. For example, they could each be implemented as a separate optical transmitter and a optical receiver. Similarly, the EW unit has also been described above as a single unit. This unit is only illustrative of a particular interfacing example for realizing the invention and as such, other physical implementations are possible. For example, the EW unit at each NE could be implemented a series of smaller interfaces, each responsible for particular interfacing function such as, for example, transmit and receive operations and still fall within the purview of the invention.

We claim:

1. In an optical transmission network wherein information is transmitted in frames, each frame containing a first plurality of bytes for transmitting payload data and a second plurality of bytes for transmitting overhead data, a method of additionally transmitting local area network (LAN) data, the method comprising:

allocating in each frame one or more bytes of the second plurality of bytes for LAN data transmissions;

for each LAN data transmission, transmitting frames with LAN data in the one or more allocated bytes until the LAN data transmission is complete:

wherein transmitting frames with LAN data in the one of more allocated bytes until the LAN data transmission is complete comprises:

encapsulating LAN data in wide-area network (WAN) frames; and transmitting frames with the encapsulated LAN data in the one of more allocated bytes until the LAN data transmission is complete.

2. In an optical transmission network wherein information is transmitted in frames, each frame containing a first plurality of bytes for transmitting payload data and a second plurality of bytes for transmitting overhead data, a method of additionally transmitting local area network (LAN) data, the method comprising:

allocating in each frame one or more bytes of the second plurality of bytes for LAN data transmissions;

for each LAN data transmission, transmitting frames with LAN data in the one or more allocated bytes until the LAN data transmission is complete;

the method adapted for transmitting LAN data between a first and a second network element (NE) in the optical transmission network via an optical link interconnecting the first and second NE.

3. The method of claim 3 wherein a LAN device is connected to the first NE and wherein before transmitting frames with LAN data in the one of more allocated bytes until the LAN data transmission is complete, the method further comprises at the LAN device:

generating the LAN data; and transmitting the LAN data generated to the first NE.

4. The method of claim 3 wherein before transmitting frames with LAN data in the one of more allocated bytes until the LAN data transmission is complete, the method further comprises at the first NE:

receiving the LAN data transmitted from the LAN device; and buffering the LAN data received for adapting the rate at which the LAN data is received at the first NE to the rate at which the LAN data received is transmitted to the second NE.

5. The method of claim 4 wherein after transmitting frames with LAN data in the one of more allocated bytes until the LAN data transmission is complete, the method further comprises at the second NE:

receiving the frames transmitted;

extracting the LAN data from each frame received; and transmitting the LAN data extracted to another LAN device connected to the second NE.

6. In an optical transmission network wherein information is transmitted in frames, each frame containing a first plurality of bytes for transmitting payload data and a second plurality of bytes for transmitting overhead data, a method of additionally transmitting local area network (LAN) data, the method comprising:

allocating in each frame one or more bytes of the second plurality of bytes for LAN data transmissions;

for each LAN data transmission, transmitting frames with LAN data in the one or more allocated bytes until the LAN data transmission is complete;

wherein each frame is an STS-N frame formed of a respective set of multiplexed STS-1 frames.

7. The method of claim 6 wherein in each STS-N frame, the one or more reallocated bytes are F1 bytes from a subset of multiplexed STS-1 frames.

8. The method of claim 7 wherein each STS-N frame is an STS-192 frame.

9. The method of claim 8 wherein the subset of multiplexed STS-1 frames consists of STS-1 frames 1 to 192.

10. The method of claim 8 wherein the subset of multiplexed STS-1 frames consists of STS-1 frames 2–12, 14–24, 26–36.

11. In an optical transmission network wherein information is transmitted in frames, each frame containing a fist plurality of bytes for transmitting payload data and a second plurality of bytes for transmitting overhead data, a method of additionally transmitting local area network (LAN) data, the method comprising:

allocating in each frame one or more bytes of the second plurality of bytes for LAN data transmissions;

for each LAN data transmission, transmitting frames with LAN data in the one or more allocated bytes until the LAN data transmission is complete;

wherein the optical transmission network is a synchronous optical network (SONET).

12. The method of claim 5 wherein the LAN data is Ethernet data and wherein the LAN device and the other LAN device are Ethernet devices.

13. The method of claim 12 wherein the LAN device and the other LAN device are respectively located in an Ethernet LAN.

14. An optical transmission network formed of multiple NEs interconnected with optical links where each link has a defined payload transmission capacity allocated for payload data transmissions and a defined overhead transmission capacity allocated for overhead data transmissions of which a portion is reallocated for LAN data transmissions, the optical transmission network comprising at each NE:

a LAN interface connected to receive LAN data for transmission in the reallocated portion of the overhead transmission capacity; and an optical transmitter connected to the LAN interface and operable to transmit the received LAN data using the reallocated portion of the overhead transmission capacity.

15. The optical transmission network of claim 14 wherein the reallocated portion of the overhead transmission capacity is scalable.

16. The optical transmission network of claim 15 wherein the reallocated portion of the overhead transmission capacity consists of an optical channel.

17. The optical transmission network of claim 15 wherein payload and overhead data is transmitted in frames, each frame containing a first plurality of bytes for transmitting payload data and a second plurality of bytes for transmitting overhead data and wherein the reallocated portion of the overhead transmission capacity consists of one or more bytes of the second plurality of bytes which are reallocated in each frame for LAN data transactions.

18. The optical transmission network of claim 17 wherein at each NE, the LAN interface comprises:

a LAN hub connected to one or more LAN devices to receive LAN data;

a central processing unit (CPU) connected to the LAN hub and operable to process and encapsulate the LAN data received into wide-area network (WAN) frames; and an overhead interface connected to the CPU and operable to forward the WAN frames to the optical transmitter for transmission in the one or more reallocated bytes.

19. The optical transmission network of claim 17 further comprising at each NE an optical receiver connected to receive LAN data transmitted in the optical transmission network using the one or more reallocated bytes.

20. The optical transmission network of claim 19 wherein the LAN interface is connected to the optical receiver to forward the LAN data received to the one or more LAN devices.

21. The optical transmission network of claim 15 wherein each frame is an STS-N frame formed of a respective set of multiplexed STS-1 frames.

22. The optical transmission network of claim 21 wherein in each STS-N frame, the one or more reallocated bytes are F1 bytes of a subset of multiplexed STS-1 frames.

23. The optical transmission network of claim 22 wherein each STS-N frame is an STS-192 frame.

24. The optical transmission network of claim 23 wherein the subset of multiplexed STS-1 frames consists of STS-1 frames 1 to 192.

25. The optical transmission network of claim 23 wherein the subset of multiplexed STS-1 frames consists of STS-1 frames 2–12, 14–24, 26–36.

26. The optical transmission network of claim 15 is a SONET network.

27. The optical transmission network of claim 15 is an OTN network.

28. The optical transmission network of claim 18 wherein the LAN data is Ethernet data and the one or more LAN devices are Ethernet devices.

29. An apparatus for a first NE in an optical transmission network for transmitting LAN data to a second NE via an optical link interconnecting the first and second NE wherein the optical link has a defined payload transmission capacity allocated for payload data transmissions and a defined overhead transmission capacity allocated for overhead data transmissions of which a portion is reallocated for LAN data transmissions, the apparatus comprising:

a LAN interface connected to receive LAN data for transmission with the reallocated portion of the overhead transmission capacity; and an optical transmitter connected to the LAN interface and operable to transmit the received LAN data using the reallocated portion of the overhead transmission capacity.

30. The apparatus of claim 25 wherein the reallocated portion of the overhead transmission capacity consists of an optical channel.

31. The apparatus of claim 25 wherein between the first and second NEs, payload and overhead data is transmitted in frames, each frame containing a first plurality of bytes for transmitting payload data and a second plurality of bytes for transmitting overhead data and wherein the reallocated portion of the overhead transmission capacity consists of one or more bytes of the second plurality of bytes which are reallocated in each frame for LAN data transactions.

32. The apparatus of claim 27 wherein the LAN interface comprises:

a LAN hub connected to receive LAN data;

a central processing unit (CPU) connected to the LAN hub and operable to process and encapsulate the LAN data received into wide-area network (WAN) frames; and an overhead interface connected to the CPU and operable to forward the WAN frames to the optical transmitter for transmission in the one or more reallocated bytes.

33. The apparatus of claim 28 wherein the LAN interface is connected to a LAN device to receive the LAN data.

34. The apparatus of claim 33 wherein the LAN interface further comprises a memory unit connected to the LAN hub and operable to buffer the LAN data received for adapting the rate at which the LAN data is received to the rate at which the LAN data is transmitted in the one or more reallocated bytes.

35. The apparatus of claim 29 further comprising an optical receiver connected to receive LAN data transmitted in frames from the second NE where in each frame, the LAN data was transmitted using the one or more reallocated bytes.

36. The apparatus of claim 35 wherein the LAN interface is connected to the optical receiver and operable to forward the transmitted LAN data to the LAN device.

37. The apparatus of claim 35 wherein the optical transmitter and optical receiver form an optical transceiver.

38. The apparatus of claim 33 wherein the LAN interface is an Ethernet LAN interface, the LAN data is Ethernet data and the LAN device is an Ethernet device.

39. A LAN interface connecting a LAN device to a NE in an optical transmission network of a defined payload transmission capacity allocated for payload data transmissions and a defined overhead transmission capacity allocated for overhead data transmissions of which a portion is reallocated for LAN data transmissions, the LAN interface being operable to receive LAN data from the LAN device and process the LAN data received for transmission using the reallocated portion of the overhead transmission capacity.

40. The LAN interface of claim 39 wherein the reallocated portion of the overhead transmission capacity consists of an optical channel.

41. The LAN interface of claim 39 wherein in the optical transmission network, payload and overhead data is transmitted in frames, each frame containing a first plurality of bytes for transmitting payload data and a second plurality of bytes for transmitting overhead data and wherein the reallocated portion of the overhead transmission capacity consists of one or more bytes of the second plurality of bytes which are reallocated in each frame for LAN data transactions.

42. The LAN interface of claim 41 comprising:

a LAN hub connected to receive LAN data from the LAN device;

a CPU connected to the LAN hub and operable to process and encapsulate the LAN data received into WAN frames;

an overhead interface connected to the CPU and operable to forward the WAN frames to an optical transmitter of the NE for transmission in the one or more reallocated bytes.

43. The LAN interface of claim 42 further comprising a memory unit connected to the LAN hub and operable to buffer the LAN data received for adapting the rate at which the LAN data is received to the rate at which the LAN data is transmitted in the one or more reallocated bytes.

44. The LAN interface of claim 42 wherein the WAN frames are high-level data link control (HDLC) frames.

45. The LAN interface of claim 42 wherein to forward the WAN frames to an optical transmitter of the NE, the overhead interface unit is operable to encapsulate the WAN frames into overhead (OH) frames.

46. The LAN interface of claim 45 wherein the LAN interface is adapted to forward LAN data transmitted to the NE in the one or more reallocated bytes to the LAN device.

47. The, method of claim 1 wherein the optical transmission network is an optical transport network (OTN).

* * * * *

UNITED STATES PATENT AND TRADEMARK OFFICE
CERTIFICATE OF CORRECTION

PATENT NO. : 6,829,247 B1
DATED : December 7, 2004
INVENTOR(S) : Trevor D. Corkum et al.

It is certified that error appears in the above-identified patent and that said Letters Patent is hereby corrected as shown below:

Title page,
Item [54], Title, "...N)..." should read -- ...(LAN)... --.

Column 14,
Lines 13, 20, 46 and 56, "...one of..." should read -- ...one or... --.
Line 38, "...of claim 3..." should read -- ...of claim 2... --.

Column 15,
Line 21, "...containing a fist..." should read -- ...containing a first... --.

Signed and Sealed this

Twenty-seventh Day of September, 2005

JON W. DUDAS
*Director of the United States Patent and Trademark Office*